United States Patent Office 3,219,458
Patented Nov. 23, 1965

3,219,458
PROCESS FOR THE PRESERVATION OF CITRUS JUICE PRODUCTS AND COMPOSITION
William K. Higby and David E. Pritchett, Ontario, Calif., assignors to Sunkist Growers, Inc., Los Angeles, Calif., a corporation of California
No Drawing. Filed Mar. 30, 1961, Ser. No. 99,355
17 Claims. (Cl. 99—155)

This invention relates to citrus juice products and has particular reference to the preservation of citrus juice and products prepared therefrom.

Citrus juice and citrus juice products are known to develop a brown or dark color in a relatively short period of time when exposed to air, due in part at least to oxidative changes. In the absence of air, citrus juices also turn brown, but more slowly, apparently from inter-reaction of juice constituents, to form dark-colored products. The latter form of browning is the most serious type in preserved citrus juices packaged in closed containers since several means are known by which atmospheric oxygen can be reduced to a very low level at the time of packaging.

Previous efforts to eliminate or retard the non-enzymic, anaerobic browning include ascorbic acid addition, addition of sulfur dioxide and packaging in containers with exposed tin surfaces. Ascorbic acid addition is relatively expensive and not always effective. For example, in concentrated lemon juice ascorbic acid promotes rather than retards browning. Sulfur dioxide cannot be used in cans because of its corrosive action and further is limited in application by its characteristic odor. In reconstituted, bottled lemon juice sulfur dioxide very effectively prevents browning but eventually gives rise to a unique and unpleasant off-taste described as "skunky." Acid foods react with tin surfaces to produce a reducing effect which prevents browning but at the same time gives rise to an unpleasant metallic off-taste and in some cases hydrogen gas is produced.

A primary object of the present invention is, therefore, to provide a novel process for inhibiting browning of citrus juices and citrus juice products.

A further object of the present invention is to provide a process for retarding or eliminating browning of citrus juice, which is effective and non-toxic, yet which does not result in loss or impairment of flavor, is inexpensive and is easy to carry out on a commercial scale.

Other objects and advantages of this invention it is believed will be readily apparent from the following detailed description of preferred embodiments thereof.

Briefly, this invention comprehends within its scope the discovery that the addition of small amounts of stannous ions to citrus juice products such as single strength lemon, orange and grapefruit juices, concentrated lemon, orange and grapefruit juices and concentrates for orangeade and lemonade, retards or inhibits browning of such products. It has further been found that not only can the juice concentrates be preserved in this manner, but that by the addition of greater amounts of stannous ions, the reconstituted beverages made from such concentrates are also preserved against darkening. Additionally, it has been discovered that optimum results are obtained by adding the stannous ions in the form of a solution of stannous chloride in concentrated hydrochloric acid.

A number of tin salts exist which can serve as sources of stannous ions for the purposes of the present invention, such as, for example, stannous chloride, stannous sulfate and stannous tartrate, which are water soluble, and stannous oxalate and stannous oxide, which are soluble in hydrochloric acid. Stannous chloride is preferred since it is readily available as a reagent grade chemical of known purity and therefore suitable as such for use in foods.

In carrying out the process of the present invention, the stannous salt is simply added to the fresh citrus juice or concentrate. Stannous chloride forms an insoluble oxychloride upon standing, and upon dilution with much water it forms an insoluble basic salt. Relatively concentrated, freshly prepared aqueous or citric acid solutions of stannous chloride can be used in carrying out the invention, but considerable care must be taken to avoid or minimize the formation of the insoluble oxychloride or basic salt, neither of which appears to be effective to prevent browning. Superior results in minimizing the formation of the insoluble compounds are obtained by dissolving the stannous chloride in concentrated hydrochloric acid and subsequently diluting the solution with water, preferably deaerated. To keep to a minimum the amount of strong acid added to the juice, only enough hydrochloric acid is used to dissolve the stannous chloride to form a clear solution. Thus, clear solutions can be obtained with as little as 2.5 ml. of hydrochloric acid for 5 g. of salt, but 1 ml. of acid is insufficient for such amount of salt.

Stannous ion additions as low as 25 parts per million retard browning moderately, increased amounts bringing about a marked retardation until a concentration of 200 to 300 p.p.m. is reached. Beyond this level, relatively small additional gain is realized. Taste tests with lemonade indicate that stannous ions can be detected at about 250 p.p.m. in the fresh product. After storage and reconstitution of concentrate for lemonade, 90 p.p.m. of stannous ions can be detected as a metallic off-taste, but taste differences between the treated and control samples are obscured by the generally improved flavor of the treated samples. Improved retention of the original flavor is an added benefit to be derived from addition of stannous ions.

The following specific examples are illustrative of the process of the present invention, but it is to be understood that the invention is not to be limited to the specific details thereof.

EXAMPLE I

A number of typical citrus juice products were prepared for testing as follows:

*Concentrate for organeade.*—0.579 g. of $SnCl_2 \cdot 2H_2O$ were dissolved in 0.29 ml. concentrated HCl. This solution was diluted with about 20 ml. water and then added to 3808 g. of concentrate giving 80 p.p.m. $Sn^{++}$. One volume of this concentrate is intended for dilution with water to 5.333 volumes of beverage. The concentrate was then pasteurized into enamel cans at 180 to 190° F. This product normally consists of orange juice, sugar, citric acid, sodium citrate and orange oil.

*Concentrate for lemonade.*—0.599 g. $SnCl_2 \cdot 2H_2O$ were dissolved in 0.3 ml. concentrated HCl. This solution was washed with a few ml. of water into 4639 g. of concentrate intended for dilution of one part to 5.333 parts by volume, giving 68 p.p.m. $Sn^{++}$ in the concentrate. The concentrate was pasteurized into enameled cans at 170 to 180° F.

*Concentrated grapefruit juice.*—0.572 g. $SnCl_2 \cdot 2H_2O$ were dissolved in 0.29 ml. concentrated HCl and then washed with a few ml. of water into 3773 g. of 5.25 fold concentrated grapefruit juice to give 80 p.p.m. $Sn^{++}$. The concentrate was then pasteurized at approximately 160° F. into enameled cans.

*Concentrated lemon juice.*—0.541 g. $SnCl_2 \cdot 2H_2O$ were dissolved in 0.28 ml. concentrated HCl and then washed with a few ml. of water into 3557 g. of 5.7 fold concentrated lemon juice. The concentrate was then pasteurized at 170 to 180° F. into enameled cans.

*Single strength lemon juice.*—9.5 g. SnCl$_2$.2H$_2$O were dissolved in 4.5 ml. concentrated HCl and then diluted to 100 ml. with distilled water to provide a solution containing 0.050 g. Sn$^{++}$ per ml.: 3.12 ml. of this solution was added to 1000 ml. (1034 g.) vacuum deaerated lemon juice (pasteurized, natural strength 6.10% acid as citric, 8.95° Brix, specific gravity 1.03382). 0.1% sodium benzoate was also added to protect against microbial spoilage, and the juice was stored in bottles.

*Single strength orange juice.*—One ml. of a SnCl$_2$.2H$_2$O solution made up by dissolving 2 g. in 1 ml. concentrated HCl and diluting to 10 ml. with water was added to 1045 g. of vacuum deaerated orange juice to give 100 p.p.m. Sn$^{++}$. The orange juice was preserved against microbial spoilage wtih 0.1% sodium benzoate and was stored in bottles.

The effect of the stannous ion on shelf line, from a color standpoint, of these products was determined by examining them for color, initially and at periodic intervals during storage. Color of single strength lemon juice, concentrated lemon juice, concentrate for lemonade and concentrated grapefruit juice was measured on a filtered mixture of equal parts isopropyl alcohol and the juice product or a dilution of the juice product using the Klett-Summerson photo-electric colorimeter with the blue, No. 42 filter and a water-isopropanol blank single strength lemon juice or concentrated lemon juice diluted to single strength was judged to be unacceptable at a reading of 125. Concentrate for lemonade dilute 75.04 g. to 100 ml. was uncceptable at a reading of 98 and concentrated grapefruit juice diluted 23–89 g. to 100 ml. was unacceptable at a reading of 175. Reflectance of concentrate for orangeade was measured using an Agtron reflectance meter on which a reading of 25 corresponded to unaccetpable loss of orange color. Color of single strength orange juice was estimated visually and samples more brown than orange were considered unacceptable. The results are set forth in Table I.

*Table I*

EFFECT OF STANNOUS IONS ON COLOR STORAGE LIFE OF SOME CITRUS JUICE PRODUCTS

| Product | Storage Temp., °F. | Untreated Storage Life, days | Treated Storage Life | | Percent improvement |
|---|---|---|---|---|---|
| | | | P.p.m. Sn$^{++}$ | days | |
| Conc. for orangeade | 100 | 77 | 80 | 78 | 1 |
| Conc. for lemonade | 82 | 150 | 68 | 181 | 21 |
| Conc. grapefruit juice | 82 | 69 | 80 | 150 | 117 |
| Conc. lemon juice | 82 | 62 | 80 | 183 | 195 |
| Single strength lemon juice | 82 | 97 | 150 | 299 | 208 |
| Single strength orange juice | 100 | 30 | 100 | >90 | >200 |

It will be noted from an inspection of Table I that in all instances except for the concentrate for orangeade, a significant improvement in shelf life was obtained. This product and some of the other orange juice products behave differently from the yellow-colored lemon and grapefruit products in that the effect of the stannous ions is less a matter of prolongation of shelf life than it is one of maintenance of brighter, more acceptable color during the effective shelf life.

An additional benefit derived from color preservation with stannous ions is improved retention of ascorbic acid. This appears to be true in all citrus juice products.

EXAMPLE II

In order to demonstrate that sufficient stannous ions can be added to concentrated lemon juice to preserve the juice both before and after reconstitution, 6.00 g. SnCl$_2$.2H$_2$O were dissolved in 3.00 ml. concentrated HCl and added to 2500 ml. (3154 g.) of 8.42 fold concentrated lemon juice, giving 1263 p.p.m. of Sn$^{++}$ in the concentrate, calculated on a weight-volume basis. The concentrate was stored in polyethylene bags sealed in cans. At periodic intervals, samples of the concentrate were removed, reconstituted, the reconstituted juice was bottled and it in turn was stored. The reconstituted juice contained 150 p.p.m. Sn$^{++}$ on a weight-volume basis. The stored reconstituted juice was examined periodically for color as described in Example I, with the following results:

*Table II*

EFFECT OF 1263 P.P.M. OF STANNOUS ION IN 8.42 FOLD CONCENTRATED LEMON JUICE ON COLOR STABILITY OF THE RECONSTITUTED JUICE

| Concentrate Stored at 35° F., days | Shelf Life of Bottled Reconstituted Juice at 82° F. | |
|---|---|---|
| | Without Sn$^{++}$, days | With Sn$^{++}$, days [1] |
| 0 | 82 | >179 |
| 35 | 35 | |
| 39 | | >136 |
| 95 | 14 | |
| 104 | | >135 |
| 184 | 31 | |
| 195 | | >86 |

[1] Because of the slow rate of darkening it was not possible to make any estimate of final shelf life.

It is to be noted that the color stability obtained in this manner is superior to that obtained by adding the same amount of stannous ions to natural strength lemon juice.

The mechanism by which the stannous ions prevent browning in citrus juice products is not entirely clear, but it is believed that it involves more than a simple reaction with oxygen to prevent oxidative reactions with the natural juice constituents, since other means of oxygen removal do not produce results comparable with those obtained by the process of the present invention. However, a direct reaction between the stannous ions and oxygen is possible and the presence of sufficient oxygen in the sealed containers will reduce or nullify the effect of the stannous ions. Accordingly, for best results, the product should be packaged in substantially oxygen-free containers.

Having fully described our invention it is to be understood that we do not wish to be limited to the details set forth but our invention is of the full scope of the appended claims.

We claim:

1. A process for inhibiting darkening of the color of citrus juice products which comprises the step of incorporating stannous ions in the citrus juice product, the stannous ions being present in an amount of at least about 25 parts per million.

2. The process of claim 1 wherein the stannous ions are present within the concentration range of from about 25 to about 300 parts per million.

3. A process for inhibiting darkening of the color of citrus juice products which comprises the step of adding stannous chloride to the citrus juice product, the stannous chloride being added to provide stannous ions having a concentration of at least about 25 parts per million.

4. The process of claim 3 wherein sufficient stannous chloride is added to provide stannous ions within the concentration range of from about 25 to about 300 parts per million.

5. The process of claim 3 wherein sufficient stannous chloride is added to provide a concentration of stannous ions of about 150 parts per million.

6. The process of claim 3 wherein the stannous chloride is added in the form of a solution thereof in hydrochloric acid, said acid being present in a non-toxic amount sufficient to dissolve said stannous chloride to form a clear solution.

7. The process of claim 4 wherein the stannous chloride is added in the form of a solution threof in hydrochloric acid, said acid being present in a non-toxic amount sufficient to dissolve said stannous chloride to form a clear solution.

8. The process of claim 5 wherein the stannous chloride is added in the form of a solution thereof in concentrated hydrochloric acid, said acid being present in a non-toxic amount sufficient to dissolve said stannous chloride to form a clear solution.

9. The process of claim 1 wherein the citrus juice product is obtained from oranges.

10. The process of claim 1 wherein the citrus juice product is obtained from grapefruit.

11. The process of claim 1 wherein the citrus juice is obtained from lemons.

12. A citrus juice product containing at least about 25 parts per million of stannous ions to inhibit darkening of the color of said product.

13. A citrus juice product containing from about 25 to about 300 parts per million, of stannous ions to inhibit darkening of the color of said product.

14. A citrus juice product containing about 150 parts per million, of stannous ions to inhibit darkening of the color of said product.

15. An orange juice product to which has been added at least about 25 parts per million of stannous chloride to inhibit darkening of said juice.

16. A lemon juice product to which has been added at least about 25 parts per million of stannous chloride to inhibit darkening of said juice.

17. A grapefruit juice product to which has been added at least about 25 parts per million of stannous chloride to inhibit darkening of said juice.

References Cited by the Examiner
UNITED STATES PATENTS

| 2,027,270 | 1/1936 | Fellers | 99—188 |
| 2,592,563 | 4/1952 | Hall et al. | 99—193 |
| 2,785,076 | 3/1957 | Felton | 99—193 |
| 2,928,744 | 3/1960 | Ponting | 99—155 X |

OTHER REFERENCES

Gregory: "Uses and Applications of Chemicals and Related Materials," New York, 1939, pp. 602 and 603.

A. LOUIS MONACELL, *Primary Examiner.*

TOBIAS E. LEVOW, HYHAN LORD, ABRAHAM H. WINKELSTEIN, *Examiners.*